No. 855,271. PATENTED MAY 28, 1907.
R. W. BAINBRIDGE.
BRAKE.
APPLICATION FILED DEC. 29, 1905.
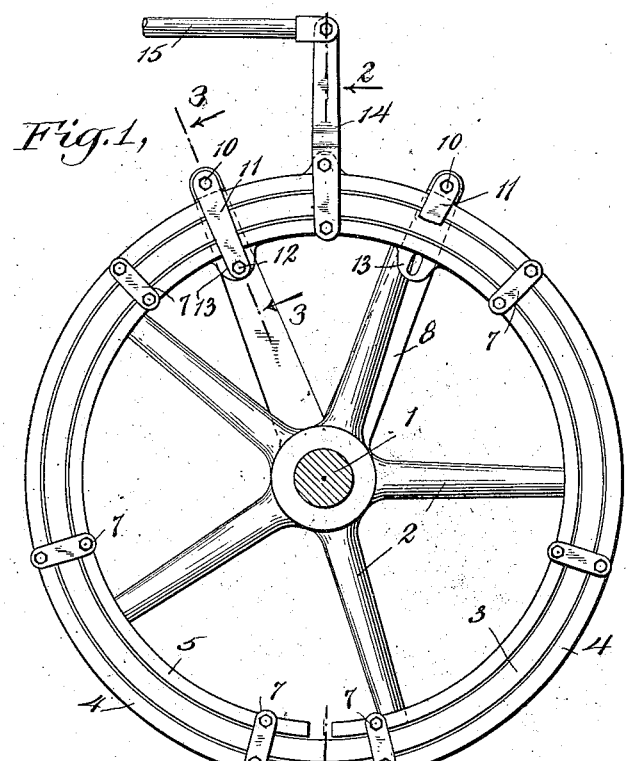
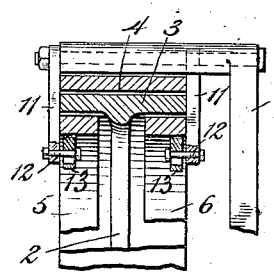
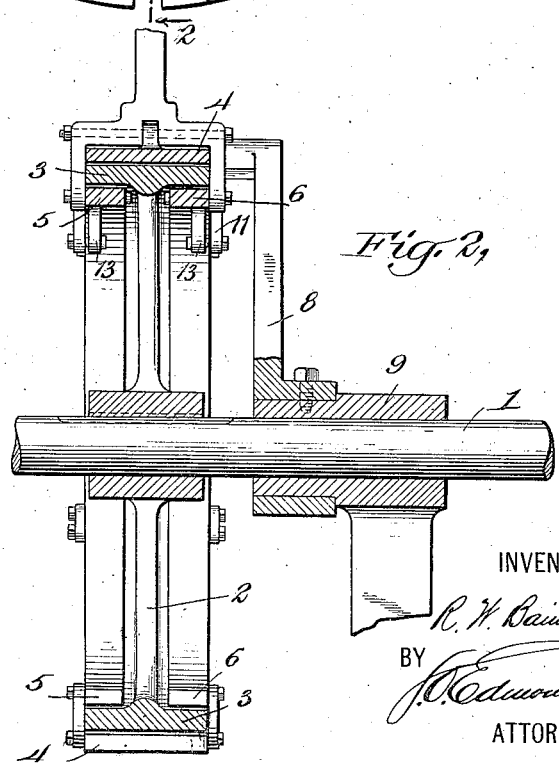
WITNESSES:
INVENTOR
R. W. Bainbridge
BY
ATTORNEY

UNITED STATES PATENT OFFICE.

RICHARD W. BAINBRIDGE, OF NEW YORK, N. Y.

BRAKE.

No. 855,271.     Specification of Letters Patent.     Patented May 28, 1907.

Application filed December 29, 1905. Serial No. 293,788.

*To all whom it may concern:*

Be it known that I, RICHARD W. BAINBRIDGE, a citizen of the United States, residing in the borough of Brooklyn, county of Kings, city and State of New York, have invented new and useful Improvements in Brakes, of which the following is a specification.

This invention relates to brakes for retarding and arresting the movement of a rotary member by the frictional engagement of parts which are brought in contact by suitable operating mechanism.

My invention may be employed to advantage in brakes for use in a variety of different relations and such changes as may be necessary in the design of the parts to adapt the brake for use in the desired connection may be made, it being understood that the principles of my invention are not limited to any particular use.

My invention contemplates the employment of a flanged member carried by the rotating part and braking devices arranged to coact frictionally with the interior and exterior surfaces of such a flange. These friction devices consist of bands having suitable friction surfaces, preferably of such dimensions that they cover almost the entire interior and exterior surfaces of the flange, and a plurality of links extending across the edges of the flange and pivoted at their ends to the friction bands. Preferably a number of these links are provided and they are distributed throughout the length of the friction bands. A suitable operating mechanism is connected to the bands and arranged to move them relatively one to the other. When thus moved the links connecting the interior and exterior bands are shifted angularly and draw the two bands together so that they engage the flange and squeeze it between them to retard and stop its rotation. The links distributed throughout the length of the brake bands draw the bands together at all points uniformly so that the friction contact is obtained over a large area.

I have illustrated the preferred embodiment of my invention in the accompanying drawings in which Figure 1 is an elevation, Fig. 2 is a section on line 2—2 of Fig. 1 and Fig. 3 is a sectional detail on line 3—3 of Fig. 1.

Referring to these drawings, 1 indicates a shaft whose rotation is to be retarded and arrested by the brake and secured thereon is a wheel consisting of spokes 2 supporting a flange 3. Extending around the exterior of the flange 3 is a brake band 4 of approximately the same width as the flange and of such length that it forms almost a complete circle. Lying adjacent to the interior of the flange are two other brake bands 5 and 6, one on either side of the spokes 2. These are preferably of the same width as the portions of the flange between one edge and the side of the spokes and are also of such length as to form almost complete circles. The outer band 4 is connected to each of the inner bands 5 and 6 by a plurality of links 7 distributed throughout the length of the bands; these links extend across the edges of the flange 3 and are pivotally connected at their ends to the bands.

The brake bands are supported when not in the braking position in any suitable manner as by a spider 8 secured on a bearing 9 for shaft 1 or some other stationary part. The spider 8 is shown as having two arms extending upward and carrying at their upper ends bolts 10 which extend across the exterior surface of the outer band 4. Pivoted on these bolts are links 11 which at their lower ends carry pins 12 extending through slots in projections 13 formed on the interior of the inner bands 5 and 6. These pin and slot connections are such that when the brake bands are in the position for free running, the inner bands 5 and 6 will fall by gravity until the pins reach the end of the slots and in this position will be supported free of the flange 3. When in this position and the operating mechanism being in such a position that the links 7 are radially disposed, the outer band 4 will also be free of the flange 3 and the brake bands will offer no resistance to the free running of the shaft.

The operating mechanism may consist of any suitable means for moving the exterior and interior bands relatively about the shaft and thus shifting the links 7 until they are disposed at angles to the radii of the wheels extending through them. I have shown, for this purpose, a lever 14 pivotally connected to the inner and outer bands and extending upward to a position convenient for the operator or to a point of connection of a suitable lever system by which the brake may be operated from a more distant point.

The inoperative position of the parts is shown in Fig. 1. To move them to the braking position, the rod 15 connected to link 14 is drawn axially thus turning lever 14 about its point of pivotal connection to the outer band 4 and this moves the inner bands 5 and 6 around the interior of the flange 3. As the inner and outer bands are moved relatively thus, the links 7 are shifted and draw the bands together into frictional engagement with the flange. As a number of these links are provided and are distributed throughout the length of the bands, the inner and outer bands are drawn together uniformly as well at their ends as at the point of connection of lever 14 and the frictional area is therefore very large, practically equal to the sum of the areas of the bands. The brake is therefore very efficient and it will be seen that it possesses the further advantages of being self-compensating for wear of the friction surfaces and of being of simple construction and hence inexpensive to produce. To release the brake the lever 14 may be moved back to the position shown in Fig. 1 by the lever system connected thereto or a spring may be provided to move it to this position against a stop when a latch for the lever system is released.

What I claim and desire to secure by Letters Patent is:

1. In a brake, a rotary member having a flange thereon, frictional brake bands co-operating with the interior and exterior surfaces of said flange and movable relatively about the axis of said flange at all points throughout their lengths, links connecting said bands, and means for moving the bands relatively about the axis of the flange, substantially as described.

2. In a brake, a shaft, a wheel having a flange secured thereon, a brake band co-operating with the exterior of said flange, two brake bands lying parallel to each other co-operating with the interior of said flange, said inner and outer bands being movable relatively about said shaft at all points throughout their lengths, links connecting the outer band to each of the inner bands, and means for moving the inner and outer bands relatively about the axis of the shaft, substantially as described.

3. In a brake, a rotary member having a flange thereon, frictional brake bands co-operating with the interior and exterior surfaces of said flange, a plurality of links each pivotally connected to said bands and means for moving said bands relatively about the axis of said flange, substantially as described.

4. In a brake, a rotary member having a flange thereon, frictional brake bands co-operating with the interior and exterior surfaces of said flange, a plurality of links each pivotally connected to said bands, said links being distributed throughout the lengths of the bands, a lever pivotally connected to said bands, and means for operating said lever, substantially as described.

5. In a brake, a shaft, a wheel having a flange secured thereon, a brake band co-operating with the exterior surface of said flange, two bands lying parallel to each other and co-operating with the interior surface of said flange, a plurality of links each connecting said outer band with one of said inner bands, and means for moving said inner and outer bands relatively, substantially as described.

6. In a brake, a rotary member having a flange thereon, frictional brake bands co-operating with the interior and exterior surfaces of said flange, a plurality of links each pivotally connected to said inner and outer brake bands, means for moving said bands relatively about the axis of said flange, and a support for said bands, substantially as described.

7. In a brake, a rotary member having a flange thereon, frictional brake bands co-operating with the interior and exterior surfaces of said flange, a plurality of links each pivotally connected to said brake bands, means for moving said bands relatively about the axis of said flange, and means for supporting one of said bands when out of engagement with said flange permitting movement thereof into engagement with the flange, substantially as described.

This specification signed and witnessed this 27th day of December, 1905.

RICHARD W. BAINBRIDGE.

Witnesses:
PHILIP M. BAINBRIDGE,
H. C. BAINBRIDGE, Jr.